United States Patent [19]

Boudreaux, Jr.

[11] Patent Number: 5,208,277

[45] Date of Patent: May 4, 1993

US005208277A

[54] GLASS REINFORCED BLENDS OF HIGHER α-OLEFINS AND POLYESTERS OPTIONALLY COMPATIBILIZED WITH CARBOXYLATED POLYOLEFINS

[75] Inventor: Edwin Boudreaux, Jr., Bartlesville, Okla.

[73] Assignee: Phillips Petroleum Company, Bartlesville, Okla.

[21] Appl. No.: 731,225

[22] Filed: Jul. 15, 1991

[51] Int. Cl.$^5$ .................. C08K 7/14; C08L 23/20
[52] U.S. Cl. .................. 523/523; 523/526; 523/527; 524/494; 524/513
[58] Field of Search .......... 523/523, 526, 527; 524/513, 494

[56] References Cited

U.S. PATENT DOCUMENTS

| | | | |
|---|---|---|---|
| 3,361,848 | 1/1968 | Siggel et al. | 260/873 |
| 3,504,080 | 3/1970 | Siggel et al. | 264/235 |
| 3,579,609 | 5/1971 | Sevenich | 260/873 |
| 3,640,944 | 2/1972 | Seppala et al. | 260/40 |
| 3,644,267 | 2/1972 | Jackson, Jr. et al. | 523/514 |
| 4,097,446 | 6/1978 | Abolins et al. | 524/513 |
| 4,368,295 | 1/1983 | Newton | 525/166 |
| 4,460,729 | 7/1984 | Books | 524/513 |
| 4,463,121 | 7/1984 | Gartland et al. | 524/291 |
| 4,572,852 | 2/1986 | Gartland et al. | 428/35 |
| 4,916,010 | 4/1990 | Yamana et al. | 428/283 |
| 4,957,968 | 9/1990 | Adur et al. | 525/74 |
| 5,091,457 | 2/1992 | Efner | 524/513 |
| 5,137,973 | 8/1992 | Khanna et al. | 524/513 |

OTHER PUBLICATIONS

Bataille, P., S. Boisse and H. P. Schreiber. "Mechanical Properties and Permeability of Polypropylene and Poly(ethylene terephthalate) Mixtures." *Polymer Engineering and Science*, Mid-May 1987, vol. 27, No. 9.

*Primary Examiner*—Paul R. Michl
*Assistant Examiner*—Andrew E. C. Merriam
*Attorney, Agent, or Firm*—Morrison Bennett

[57] ABSTRACT

A composition comprising a blend of (a) at least one polymer of branched higher alpha-olefin; (b) at least one polyester; and (c) glass fiber is provided. The composition may optionally additionally contain at least one carboxylated polyolefin. A method for making that composition is also provided.

5 Claims, No Drawings

GLASS REINFORCED BLENDS OF HIGHER α-OLEFINS AND POLYESTERS OPTIONALLY COMPATIBILIZED WITH CARBOXYLATED POLYOLEFINS

BACKGROUND OF THE INVENTION

This invention relates to blends of (a) polymers of branched higher alpha-olefins, (b) polyesters, and (c) glass fiber, which may optionally contain (d) carboxylated polyolefins.

Recently, great emphasis has been placed upon modifying the structure of polymers of branched higher alpha-olefins in order to improve the performance characteristics of these polymers. Most of the methods deal with creating a more interactive surface between the polymer structure and the other constituents of the composition. However, a method of producing thermally resistant compositions of polymers of branched higher alpha-olefins in which the polymer structure does not have to be substantially altered would be of great scientific and economic value.

Blends of polypropylene and polyethylene terephthalate have been used for an increasing range of applications, including geotextiles and films or sheets.

Blends of a minor amount of higher alpha-olefins with a major amount of polyethylene terephthalate have been used for compositions for making films or sheets which do not need to be reinforced or have high temperature properties.

Blends of minor amounts of polyolefins and major amounts of polyesters have also been glass reinforced for application as electrical connectors, mechanical components, and the like. Since some of these blended polymers are relatively immiscible, various means of compatibilization have been attempted, including the use of carboxylated polyolefins such as polypropylene-acrylic acid graft copolymers.

There is a continuing need for polyolefin blends from which can be made glass reinforced articles having good thermal stability and good mechanical properties.

SUMMARY OF THE INVENTION

It is an object of this invention to provide polymer and glass fiber reinforced polyester blends with enhanced properties and methods for making those blends.

It is another object of this invention to provide articles of manufacture made from the inventive blends and methods for making these articles of manufacture.

In accordance with one embodiment of this invention, a composition is made by combining (a) one or more branched higher alpha-olefins; (b) one or more polyesters; and (c) glass fiber.

In accordance with another embodiment of this invention, a composition is made by combining (a) one or more branched higher alpha-olefins; (b) one or more polyesters; (c) one or more carboxylated polyolefins; and (d) glass fiber.

DETAILED DESCRIPTION OF THE INVENTION

It has been discovered that by blending and glass reinforcing a major amount of a branched higher alpha-olefin and a minor amount of a polyester, there can be produced compositions from which can be made articles having surprising and unexpectedly high heat deflection temperatures and acceptable mechanical properties such as tensile strength, flexural strength and impact strength. This can be done without having to modify the branched higher alpha-olefin polymer structure through reactive processing or grafting reactions.

It has also been discovered that these compositions can have a carboxylated polyolefin as an optional ingredient, which may be useful in preventing long term phase separation.

The compositions of this invention are blends of polymers of one or more branched higher alpha-olefins, one or more polyesters, and glass fibers, optionally compatibilized with one or more carboxylated polyolefins, from which can be made injection molded articles having surprising and unexpectedly high heat deflection temperatures. The useful articles molded from the compositions of this invention exhibit heat deflection temperatures significantly above rule of mixtures predictions while not having other properties significantly compromised.

BRANCHED HIGHER ALPHA-OLEFIN POLYMERS

Polymers considered suitable for use in this invention are olefinic polymers which have a melting point higher than about 180° C., more preferably, a melting point of greater than about 190° C. Polymers produced from linear monomers, such as ethylene, propylene, butene, and hexene, usually have lower melting points than polymers of branched higher alpha-olefins. Thus, the branched higher alpha-olefin polymers useful in this invention are homopolymers and copolymers of branched higher alpha-olefins. The preferred alpha-olefin monomers have from about 4 to 12 carbon atoms. Exemplary monomers include, but are not limited to, 3-methyl-1-butene (3MB1), 3-methyl-1-pentene (3MP1), 4-methyl-1-pentene (4MP1), 4-methyl-1-hexene (4MH1), 3,3-dimethyl-1-butene (3,3DMB1), 4,4-dimethyl-1-hexene (4,4DMH1), and other similar monomers. Most preferably, polymers of 4-methyl-1-pentene (4MP1), also called polymethylpentene (PMP), are used. Table I gives the approximate melting point of each homopolymer indicated above.

TABLE I

| Melting Points of Examplary Homopolymers | |
|---|---|
| Polymerized Monomer | Approx. Melting Temp., °C. |
| 3-methyl-1-butene | 300 |
| 3-methyl-1-pentene | 370 |
| 4-methyl-1-pentene | 240 |
| 4-methyl-1-hexene | 196 |
| 3-ethyl-1-hexene | 425 |
| 3,3-dimethyl-1-butene | 400 |
| 4,4-dimethyl-1-hexene | 350 |

The term "branched higher alpha-olefin polymer", as used in this disclosure, includes homopolymers, as well as copolymers. Copolymers comprise the product resulting from combining a branched higher alpha-olefin with any other olefin monomer or monomers. For example, a branched higher alpha-olefin can be polymerized in the presence of, or in series with, one or more olefin monomers. Generally, applicable comonomers have from about 2 to about 18 carbon atoms and preferably have from about 8 to about 16 carbon atoms. Most preferably, the comonomer or comonomers are alpha-olefins. Longer chain linear olefins are preferred in that they are easier to copolymerize with higher, branched alpha-olefins and can impart increased clarity, stability, and impact strength to the resultant polymer. Exemplary comonomers include, but are not limited to, 1-octene, 1-decene, 1-dodecene, 1-tetradecene, 1-hexadecene, and other higher olefins. A suitable polymer composition can also be obtained by physically blending homopolymers and/or copolymers.

In general, it is preferred for the polymer to comprise at least about 85 mole percent moieties derived from higher, branched alpha-olefins, and more preferably, at least about 90 mole percent. Most preferably, the polymer comprises at least about 95 mole percent moities derived from higher, branched alpha-olefins, which results in a polymer of superior strength and a high melting point.

STABILIZING PACKAGE FOR THE BRANCHED HIGHER ALPHA-OLEFIN POLYMERS

After the branched higher alpha-olefin polymer has been produced it may be given a prophylatic charge with a hindered phenol before additional processing of the polymer. The hindered phenol acts as an antioxidant and improves the heat, light, and/or oxidation stability of the polymer. As a result of the prophylactic charge, the polymer product can withstand drying and storage after the polymerization process. Any hindered phenol in an amount which improves the heat, light, and/or oxidation stability of the polymer is applicable. Exemplary hindered phenol compounds include, but are not limited to, 2,6-di-tert-butyl-4-methylphenol; tetrakis(-methylene 3-(3,5-di-tert-butyl-4-hydroxyphenyl)propionate)methane; thiodiethylene bis(3-(3,5-di-tert-butyl-4-hydroxyphenyl)propionate); octadecyl 3-(3,5-di-tert-butyl-4-hydroxyphenyl)propionate; tris(3,5-di-tert-butyl-4-hydroxybenzyl)isocyanurate; 1,3,5-trimethyl-2,4,6-tris(3,5-di-tert-butyl-4-hydroxybenzyl)benzene; and/or 2,2'-methylene bis(4-methyl-6-tert-butylphenol).

In addition to the optional prophylactic charge of hindered phenol, other antioxidants or stabilizers can be added to further stabilize the branched higher alpha-olefin polymer. The type(s) of stabilizer(s) used depends on the final application or use of the polymer. Numerous polymer additives are commercially available and are usually selected from the group consisting of hindered phenols, thiosynergists, organic phosphites, hindered amine light stabilizers, and mixtures thereof.

Thiosynergists which may be used as stabilizers for the higher alpha-olefin polymer include, but are not limited to, dilaurylthiodiproprionate and distearylthiodiproprionate.

The total polymer stabilizer package which comprises the hindered phenol antioxidant prophylactic charge, and/or additional hindered phenol, and/or organic phosphite, and/or one or more thiosynergists, and/or hindered amine light stabilizer, when used, is usually added to the polymer in the range of about 0.05 to about 2 parts by weight of total stabilizer(s) per 100 parts by weight of polymer (phr). If desired, additional stabilizers, i.e., in excess of 2 phr, can be added any time after addition of the branched higher alpha-olefin polymer stabilizing package, if any is used, depending on the desired polymer properties and desired properties of the blend compositions and molded articles to be made therefrom.

Polyester

The polyesters useful in this invention are crystalline thermoplastic resins formed from dihydroxy compound units derived from at least one compound selected from the group consisting of aliphatic glycols such as ethylene glycol, propylene glycol, 1,4-butanediol, neopentyl glycol, and hexamethylene glycol; alicyclic glycols such as cyclohexane dimethanol, and aromatic dihydroxy compounds such as bisphenol and at least one dicarboxylic acid selected from the group consisting of aromatic dicarboxylic acids such as terephthalic acid, isophthalic acid, and 2,6-naphthalene dicarboxylic acid, aliphatic dicarboxylic acids such as oxalic acid, succinic acid, adipic acid, sebacic acid, and undecanedoic acid, and alicyclic dicarboxylic acids such as tetrahydroterephthalic acid. These polyesters can be modified with a small amount of tri- or higher polyhydroxy compounds and polycarboxylic acids such as triols and tricarboxylic acids as long as the modified resins are thermoplastic. Mixtures of two or more polyesters can be used in this invention.

Typical examples of the polyesters described above are polyethylene terephthalate, polybutylene terephthalate, and polyethylene isophthalate-terephthalate copolymer. Polycyclohexane dimethylene terephthalate and polyethylene napthenate are also considered useful in this invention. Presently preferred is polyethylene terephthalate.

The polyethylene terephthalate employed herein generally has an inherent viscosity of at least about 0.25, preferably about 0.6 as measured by ASTM D-2857. The polyethylene terephthalate preferably has an upper limit on inherent viscosity of about 1.2. Inherent viscosity is measured in a 3:1 volume ratio of methylene chloride and trifluoroacetic acid at 30° C. The term "polyethylene terephthalate" as used herein is used generally to include high molecular weight polymers made by condensing ethylene glycol with terephthalic acid or dimethylterephthalate no matter how prepared. This term is meant to include polyethylene terephthalate polymers which are modified by the inclusion of minor amounts, e.g., less than about 20 percent by weight of the polymer, of comonomers or modifying agents. Such comonomers or modifying agents include various diols such as 1,4-butanediol, cyclohexane dimethanol, diethylene glycol, hydrolyzed polyalkylene oxides, neopentyl glycol, butylene glycol, and 1,3-propanediol or mixtures of two or more diols or modifying agents. Likewise, such comonomers or modifying agents can include various diacids such as isophthalic acid, adipic acid, sebacic acid, 2,6-naphthalene dicarboxylic acid and hydroxy acids such as p-hydroxy benzoic acid. Mixtures of two or more diacids and/or hydroxy acids may be used. Mixtures of polyethylene terephthalate resins can be used. Suitable polyethylene terephthalate polymers are commercially available.

Glass Fibers

Commercially available glass fibers of the types usually used for reinforcing polyesters have been successfully used in this invention.

The glass fibers presently preferred have an average cross-sectional thickness in the range from about 3 to 15 microns, preferably from about 8 to about 10 microns and an average length in the range from about 2 to about 50 millimeters, preferably from about 2.5 to about 5 millimeters.

The presently preferred glass fibers are pretreated with a sizing agent which can contain one or more components selected from the group consisting of coupling agents, film-formers, lubricants, emulsifiers, and the like. Glass fibers which are presently preferred for this invention have sizing components which include amino-silane coupling agents and polyurethane film-formers, although glass fibers with other sizing materials can also be used.

One such glass fiber reinforcement is produced by Owens-Corning Fiberglas Corporation of Toledo, Ohio, and marketed under the trade designation of 492AA. Another useful glass fiber reinforcement is produced by CertainTeed Corporation of Valley Forge, Pa., and marketed under the trade designation of Chopped Strand 93B. Yet another useful glass fiber reinforcement is produced by PPG Industries, Inc., of Pittsburgh, Pa., and marketed under the trade designation Type 3540 Chopped Strand. Each of these glass fiber products has a G-filament diameter (about 9 microns). Each of these glass fiber products is marketed for use in nylon and polyethylene terephthalate.

Carboxylated Polyolefins

Carboxylated polyolefins contemplated as useful in this invention can generally be any polyolefin homopolymer or copolymer which has carboxyl groups on the polyolefin chain. This can be accomplished by any of several means, including grafting by any manner effective to introduce carboxyl groups onto the polyolefin chain. Grafting is usually done in the presence of a free radical generator and usually by a solution or melt process.

The carboxylated polyolefins presently preferred, when used in this invention, are grafted polymers prepared by grafting a polymer of a $C_2$ to $C_8$ mono-alpha-olefin or its copolymers with unsaturated mono- and polycarboxylic-containing acids and derivatives, unsaturated mono- and polycarboxylic-containing anhydrides and derivatives, and mixtures thereof, in the presence of a free radical generator. Presently most preferred is a carboxylated polypropylene, particularly maleinated polypropylene. The grafting can be done by any effective means, including those disclosed in U.S. Pat. No. 4,003,874, which is hereby incorporated herein by reference.

The carboxylated polyolefin may, if desired, be neutralized or partially neutralized. This is usually done with a metal ion, such as $Na^{30}$, $Zn^{++}$, or the like, to form an ionomer.

One such carboxylated polypropylene is produced by Himont U.S.A., Inc., of Wilmington, Del., and marketed under the trade designation of Pro-fax PC-072 Polypropylene. Another carboxylated polypropylene is produced by E. I. DuPont de Nemours and Company of Wilmington, Del., under the trade designation of FUSABOND ® P. These products are believed to be graft polymers of polypropylene and maleic anhydride. The amount of maleic anhydride functionality is believed to be less than 2% by weight. Another carboxylated polypropylene is produced by BP Performance Polymers, Inc., of Hackettstown, N.J., and marketed under the trade designation of Polybond ®. These products are believed to be graft polymers of polypropylene and acrylic acid. The amount of acrylic acid functionality is believed to be about 6% by weight.

Other Polymer Additives

Other additives, in addition to the previously discussed additives for use in the branched higher alpha-olefin polymer, can optionally be incorporated into the branched higher alpha-olefin polymer, the polyester, the carboxylated polyolefin, or any mixtures of these to achieve additionally desired beneficial polymer properties. General exemplary additives include, but are not limited to, antioxidants, antioxidant synergists, UV absorbers, heat stabilizers, nucleating agents, pigments, surface active agents, plasticizing agents, optical brighteners, antistatic agents, flame retardants, emulsifiers, lubricating agents, anticorrosive agents, metal inhibitors, degradability additives, and the like. Processing lubricants can also be added to enhance polymer properties. Examples of processing lubricants include, but are not limited to, fatty acids containing about 10 to about 20 carbon atoms and the metal salts thereof. Usually, metal stearates, such as, for example, calcium stearate and zinc stearate, and/or metal laurates are used as processing lubricants and/or acid scavengers for polyolefins. If corrosion is a potential problem, one or more corrosion inhibitors can be added.

Compounding

The branched higher alpha-olefin polymers, if stabilized with a prophylactic charge of hindered phenol, thiosynergists, organic phosphites or other polymer stabilizer, may be stabilized prior to compounding with the polyester, reinforcing material, and carboxylated polyolefin, if used. For ease of operation, the initial prophylactic charge of hindered phenol, if used, is usually solution or slurry mixed with the polymer prior to drying and handling of the polymer.

The branched higher alpha-olefin polymer, the polyester, reinforcing material, and carboxylated polyolefin, if used, may be added to each other in any other and blended together in any convenient manner.

In these types of methods, the polymer can be in any form, such as, for example, fluff, powder, granulate, pellet, solution, slurry, and/or emulsion.

Any additive can be combined with the polymers according to any method known in the art. Examples of incorporation methods include, but are not limited to, dry mixing in the form of a powder and wet mixing in the form of a solution or slurry.

The compositions of this invention generally comprise, in addition to at least one branched higher alpha-olefin polymer, from about 5 to about 100, more preferably from about 10 to about 75, and most preferably from about 15 to about 55, weight percent based on the weight of branched higher alpha-olefin polymer of at least one polyester resin; from zero to about 35, more preferably from 1 to about 30, most preferably from about 2.5 to about 25, weight percent based on the weight of branched higher alpha-olefin polymer of at least one carboxylated polyolefin; and from about 10 to about 60, more preferably from about 10 to about 50, and most preferably from about 15 to about 45, weight percent based on the weight of the total composition of glass fiber. When the carboxylated polyolefin is included in the composition, generally at least 1 weight percent based on the weight of branched higher alpha-olefin polymer is needed. More generally, an effective amount to prevent long term phase separation is needed.

In accordance with a preferred embodiment of this invention, there is provided a polymer blend consisting essentially of polymethylpentene, polyethylene terephthalate, maleinated polypropylene and glass fibers. The components can be blended together in any convenient manner. For example, the polyethylene terephthalate and maleinated polypropylene, if used, can be combined with polymers of polymethylpentene according to any suitable method known in the art. Examples of these methods include, but are not limited to, dry mixing in the form of a powder, wet mixing in the form of a solution or slurry, and melt extrusion compounding. In these types of methods, the polymethylpentene, polyethylene terephthalate, and maleinated polypropylene, if used, can be in any form, such as, for example, fluff, powder, granulate, pellet, solution, slurry, and/or emulsion. Melt extrusion compounding can be carried out using any suitable method such as in single screw or twin screw extruders at temperatures above the melting point of the polymethylpentene. Generally, temperatures in the range of about 260° C. to about 330° C. would be used. Melt extrusion compounding is the presently preferred method of combination. The glass fibers can be mixed with the polymethylpentene, polyethylene terephthalate, and maleinated polypropylene, if used, prior to extrusion. Alternately, the glass fibers can be added downstream from the extruder after compounding of the polymethylpentene, polyethylene terephthalate and maleinated polypropylene, if used.

EXAMPLES

The polymethylpentene (PMP) used in the following examples was a 1-decene copolymer produced by Mitsui Petrochemical Industries, Inc., and designated TPX RT-18. It is believed that this polymer had been stabilized with 0.1phr (tetrakis(methylene 3-(3,5-di-tert-butyl-4-hydroxyphenyl)proprionate)methane) and 0.2phr dilaurylthiodiproprionate with zinc stearate as an acid scavenger. It had a nominal flow rate of 26 grams per 10 minutes (as measured by ASTM Method D1238-86 using a 5 kilogram weight at 260° C.). In each of the following examples, the PMP was compounded with the indicated amounts of polyethylene terephthalate (PET) (one having 0.6 intrinsic viscosity available from 3M Corporation), maleinated polypropylene (Pro-Fax PC-072. a tradename for a product of Himont U.S.A., Inc.), and glass fiber reinforcement. The glass fiber reinforcements used were commercial products from Owens-Corning Fiberglas Corporation. One product was designated 457BA, a 3/16-inch length, K-filament diameter fiber sized for compatibility with polypropylene. The other product was designated 492AA. a 1/8-inch length, G-filament diameter fiber sized for compatibility with polyethylene terephthalate.

all ingredients for each formulation were tumble mixed and compounded on a 1.5-inch diameter Davis-Standard single screw extruder with a double Dulmage screw at 90 RPM and a 280° C. flat temperature profile. The compositions were stranded, pelletized, and dried overnight at 80° C. The pelletized compositions were molded into ASTM test specimens with a New Britain Model 75 injection molding machine with a 75-ton clamp force. The mold temperature was 65° C. and the barrel temperatures were 280° to 295° C. Cycle time was 30 seconds. For both the compounding and the injection molding, a nitrogen purge was applied to the machine feed throats.

The ASTM test procedures shown in Table II below were utilized in the testing.

TABLE II

| Test Procedures Used in Testing | |
|---|---|
| Analysis | ASTM Method Number and Conditions |
| Melt Flow Rate | D1238-86, 260° C., 5 kg load |
| Tensile Strength at Break (ksi) | D638-86, at 5 mm/min, type I test specimens |
| Elongation at Break (%) | D638-86, at 5 mm/min |
| Flexural Strength (ksi) | D790-86, 2 inch span, 1 mm/min 5" × ¼" × ¼" test specimens |
| Flexural Modulus (ksi) | D790-86, 2 inch span, 1 mm/min 5" × ¼" × ¼" test specimens |

TABLE II-continued

| Test Procedures Used in Testing | |
|---|---|
| Analysis | ASTM Method Number and Conditions |
| Izod Impact Strength, Notched and Unnotched (ft-lb/in) | D256-84 |
| Heat Deflection Temperature (°C.) | D648-82, at 264 psi load 5" × ¼" × ¼" test specimens |

EXAMPLE 1

Table III shows the properties of 30 percent glass reinforced blends of PMP and PET prepared in the manner described above. Runs 1 and 2 were made without PET for comparison purposes. Both compounds had 7 percent by weight of the total composition of a maleinated polypropylene or 10 percent by weight maleinated polypropylene based on weight of PMP and maleinated polypropylene. These runs show that the 457BA glass reinforcement provided better overall performance than 492 AA glass.

Runs 3, 5, 7 and 8 were blends of PMP and PET which were made to demonstrate the full compositional range. Each blend had 7 percent by weight maleinated polypropylene based on the total weight of the composition or 10 percent maleinated polypropylene based on the weight of PMP, PET and maleinated polypropylene. Each blend was reinforced with 492AA glass. Run 3 had 15.75 percent by weight PET based on the total weight of the composition or 25 percent by weight PET based on the weight of PMP and PET only. Run 5 had 31.5 percent by weight PET based on the total weight of the composition or 50 percent by weight based on the weight of PMP and PET only. Run 7 had 47.25 percent by weight PET based on the weight of the total composition or 75 percent by weight based on the weight of PMP and PET only. Run 8 had 63 percent by weight PET based on the weight of the total composition or 100 percent by weight based on the weight of PMP and PET only.

Runs 1, 3, 5, 7 and 8 demonstrated that addition of up to 50 percent by weight PET based on the weight of PMP and PET or up to 31.5 percent by weight of PET based on the total weight of the composition provided an unexpected increase in heat deflection temperature based on rule-of-mixtures behavior. All other properties fell below the rule-of-mixtures tieline between runs 1 and 8, indicating incompatibility of the blends. Above 50 percent by weight PET based on the weight of PMP and PET or above 31.5 percent by weight of PET based on the total weight of the composition, the heat deflection temperature fell below the rule-of-mixtures tieline between runs 1 and 8, indicating that the blends in that compositional range were completely incompatible. However, addition of relatively small amounts of PET to PMP produced compositions with enhanced deflection temperature. Further, such compositions had similar mechanical properties to the PMP comparison run 1 without pet. Therefore, addition of relatively small amounts of PET to glass reinforced PMP blends presented a method of improving the thermal performance of glass reinforced PMP without affecting the other mechanical properties.

Runs 4 and 5 demonstrated that maleinated polypropylene only provided slight compatibilization of the blend of PMP and PET. In fact, the maleinated polypropylene reduced and heat deflection temperature of the blend. Runs 5 and 6 demonstrated that the 4982AA glass reinforcement provided the best performance for the blends of PMP and PET.

TABLE III

PMP and PET Blends: Properties as a Function of PET Level in 30% Glass Reinforced Compositions

| | Run No. | | | | | | | |
|---|---|---|---|---|---|---|---|---|
| | 1 | 2 | 3 | 4 | 5 | 6 | 7 | 8 |
| Ingredients | | | | | | | | |
| Polymethylpentene, wt. %[a] | 63.00 | 63.00 | 47.25 | 35.00 | 31.50 | 31.50 | 15.75 | |
| Polyethylene terephthalate, wt. %[a] | | | 15.75 | 35.00 | 31.50 | 31.50 | 47.25 | 63.00 |
| Maleinated polypropylene, wt. %[a] | 7.00 | 7.00 | 7.00 | | 7.00 | 7.00 | 7.00 | 7.00 |
| 457BA glass, wt. %[a] | 30.00 | | | | | 30.00 | | |
| 492AA glass, wt. %[a] | | 30.00 | 30.00 | 30.00 | 30.00 | | 30.00 | 30.00 |
| Properties | | | | | | | | |
| Tensile Strength, ksi | 6.9 | 4.0 | 6.6 | 6.4 | 7.6 | 6.0 | 8.9 | 12.1 |
| Elongation, % | 2.0 | 3.3 | 1.4 | 1.3 | 1.8 | 1.2 | 1.7 | 2.1 |
| Flexural Strength, ksi | 10.0 | 7.0 | 9.3 | 10.6 | 10.7 | 8.4 | 13.5 | 15.6 |
| Flexural Modulus, ksi | 735 | 704 | 914 | 974 | 1095 | 966 | 1206 | 1320 |
| Notched Izod, ft-lb/in | 1.2 | 1.3 | 1.2 | 1.3 | 1.2 | 1.1 | 1.3 | 1.5 |
| Unnotched Izod, ft-lb/in | 2.7 | 3.7 | 2.4 | 2.7 | 2.7 | 1.6 | 3.0 | 4.2 |
| Heat Deflection Temperature at 264 psi, °C. | 144.6 | 101.7 | 170.9 | 202.9 | 183.3 | 155.8 | 186.6 | 220.0 |

[a]Weight percent based on total weight of the composition.

EXAMPLE 2

Additional runs were made which confirm the findings observed in the tests of runs reported in Example 1. Data from these runs are illustrated in Table IV. Run 9 was made without PET for comparison purposes. The composition included 30 percent by weight of 457BA glass reinforcement and 7 percent by weight maleinated polypropylene based on the total weight of the composition.

Runs 10, 11 and 12 were inventive runs made with 492AA glass reinforcement. Run 10 had 9.45 percent by weight of PET based on the total weight of composition or 15 percent PET by weight based on the weight of PMP and PET only. Run 11 had 15.75 percent PET by weight based on the total weight of the composition or 25 percent PET by weight based on the weight of PMP and PET only. Run 12 had 22.05 percent by weight of PET based on the total weight of the composition or 35 percent PET by weight based on the weight of PMP and PET only.

In all of the runs of Table IV, the maleinated polypropylene was 10 percent by weight based on the total weight of PMP, PET and maleinated polypropylene. Runs 10, 11 and 12 again demonstrated that addition of relatively small amounts of PET to glass reinforced PMP provided enhanced thermal performance with little effect on the mechanical properties.

TABLE IV

PMP and PET Blends: Properties as a Function of PET Level in 30% Glass Reinforced Compositions

| | Run No. | | | |
|---|---|---|---|---|
| | 9 | 10 | 11 | 12 |
| Ingredients | | | | |
| Polymethylpentene, wt. %[a] | 63.00 | 53.55 | 47.25 | 40.95 |
| Polyethylene terephthalate, wt. %[a] | | 9.45 | 15.75 | 22.05 |
| Maleinated polypropylene, wt. %[a] | 7.00 | 7.00 | 7.00 | 7.00 |
| 457BA glass, wt. %[a] | 30.00 | | | |
| 492AA glass, wt. %[a] | | 30.00 | 30.00 | 30.00 |
| Properties | | | | |
| Tensile Strength, ksi | 6.5 | 6.0 | 6.3 | 7.1 |
| Elongation, % | 1.9 | 1.6 | 1.6 | 1.9 |
| Flexural Strength, ksi | 9.5 | 8.5 | 9.3 | 10.6 |
| Flexural Modulus, ksi | 654 | 751 | 801 | 818 |
| Notched Izod, ft-lb/in | 1.3 | 1.2 | 1.3 | 1.4 |

TABLE IV-continued

PMP and PET Blends: Properties as a Function of PET Level in 30% Glass Reinforced Compositions

| | Run No. | | | |
|---|---|---|---|---|
| | 9 | 10 | 11 | 12 |
| Unnotched Izod, ft-lb/in | 2.9 | 2.7 | 2.9 | 3.3 |
| Heat Deflection Temperature, at 264 psi, °C. | 145.3 | 155.3 | 158.6 | 167.5 |

[a]Weight percent based on total weight of the composition.

EXAMPLE 3

Additional data was gathered to confirm the finding that maleinated polypropylene was an optimal ingredient in the compositions described in Example 1. In runs 13, 14, 15 and 16 shown in Table V, maleinated polypropylene was omitted from the compositions. Run 13 was a comparison run made to provide baseline properties. Runs 14, 15 and 16 were inventive runs. Run 14 had 10.5 percent by weight PET based on the total weight of the composition or 15 percent by weight PET based on the weight of PMP and PET only. Run 15 had 17.5 percent by weight PET based on the total weight of the composition or 25 percent by weight PET based on the weight of PMP and PET only. Run 16 had 24.5 percent by weight PET based on the total weight of the composition or 35 percent by weight PET based on the weight of PMP and PET only. Runs 14, 15 and 16 again demonstrated that addition of relatively small amounts of PET to glass reinforced PMP provided enhanced thermal performance with little effect on mechanical properties.

Runs 4 (shown in Table III) and runs 13–≠(shown in Table V) demonstrated that rule-of-mixtures behavior for heat deflection temperature does not occur the full composition range of PMP and PET. In the range of 65–85% PMP/15–35% PET, the heat deflection temperature values indicated synergistic behavior, i.e., above the rule-of-mixtures values. A blend with 10% PET did not show an unexpected increase in HDT. Below levels of 35% PET in the compositions, there was essentially no change in other properties in comparison to those properties in 100% PMP compositions, although this represents below rule-of-mixtures behavior for the other properties.

TABLE V

PMP and PET Blends: Properties as a Function of PET level in 30% Glass Reinforced Compositions

|  | Run No. | | | |
| --- | --- | --- | --- | --- |
|  | 13 | 14 | 15 | 16 |
| Ingredients |  |  |  |  |
| Polymethylpentene, wt. %[a] | 70.0 | 59.5 | 52.5 | 45.5 |
| Polyethylene terephthalate, wt. %[a] |  | 10.5 | 17.5 | 24.5 |
| 457BA glass, wt. %[a] | 30.00 |  |  |  |
| 492AA glass, wt. %[a] |  | 30.00 | 30.00 | 30.00 |
| Properties |  |  |  |  |
| Tensile Strength, ksi | 6.0 | 5.7 | 6.5 | 7.3 |
| Elongation, % | 1.9 | 1.4 | 1.6 | 1.8 |
| Flexural Strength, ksi | 8.8 | 8.2 | 9.1 | 10.7 |
| Flexural Modulus, ksi | 622 | 788 | 804 | 834 |
| Notched Izod, ft-lb/in | 1.4 | 1.3 | 1.4 | 1.4 |
| Unnotched Izod, ft-lb/in | 2.6 | 2.5 | 2.8 | 3.2 |
| Heat Deflection Temperature, at 264 psi, °C. | 134.2 | 164.4 | 173.7 | 181.5 |

[a]Weight percent based on total weight of the composition.

While the compositions, processes and articles of manufacture of this invention have been described in detail for the purpose of illustration, the inventive compositions, processes and articles are not to be construed as limited thereby. This patent is intended to cover all changes and modifications within the spirit and scope thereof.

That which is claimed is:

1. A method for improving the thermal performance of polymethylpentene/polyethylene terephthalate blends said method comprising admixing with polymethylpentene:
   (a) an amount of polyethylene terephthalate in the range of about 15 to about 55 weight percent based on the weight of said polymethylpentene;
   (b) an amount of glass fiber in the range of about 10 weight percent to about 50 weight percent, based on the total weight of the composition; and
   (c) an amount of at least one carboxylated polyolefin in the range of about 1 weight percent to about 35 weight percent based on the weight of said polymethylpentene thereby providing a blend of glass, polymethylpentene, polyethylene terephthalate and carboxylated polyolefin.

2. A method of claim 1 wherein said carboxylated polyolefin is carboxylated polypropylene.

3. A method of claim 2 wherein said carboxylated polypropylene is maleinated polypropylene.

4. A blend of glass, polymethylpentene, polyethylene terephthalate and carboxylated polyolefin produced by the method of claim 1.

5. A blend of glass, polymethylpentene, polyethylene terephthalate and carboxylated polyolefin produced by the method of claim 3.

* * * * *